Figure 1:
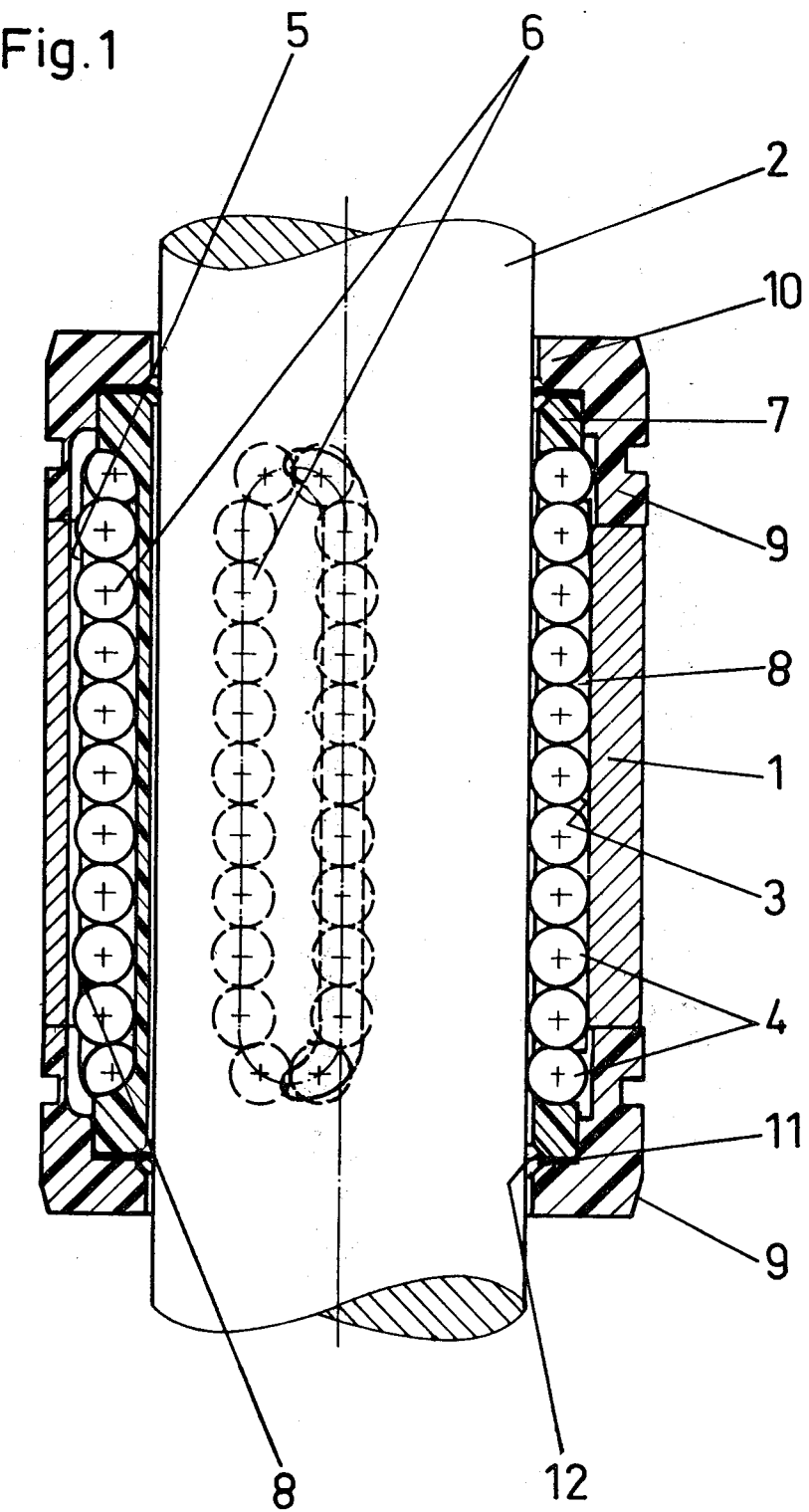

United States Patent [19]

Olschewski et al.

[11] 4,411,478
[45] Oct. 25, 1983

[54] ROLLING BEARING FOR LENGTHWISE GUIDING OF A SHAFT OR THE LIKE

[75] Inventors: Armin Olschewski, Schweinfurt; Manfred Brandenstein, Eussenheim; Lothar Walter, Schweinfurt; Horst M. Ernst, Eltingshausen, all of Fed. Rep. of Germany

[73] Assignee: SKF Kugellagerfabriken GmbH, Schweinfurt, Fed. Rep. of Germany

[21] Appl. No.: 317,504

[22] Filed: Nov. 2, 1981

[30] Foreign Application Priority Data

Nov. 6, 1980 [DE] Fed. Rep. of Germany ....... 3041804

[51] Int. Cl.³ .......................... F16C 29/06; F16J 15/32
[52] U.S. Cl. ..................................... 308/6 C; 277/152
[58] Field of Search ............... 308/6 C, 6 A, 3.5, 277; 277/212 F, 206 R, 29, 153, 152

[56] References Cited

U.S. PATENT DOCUMENTS

| | | | |
|---|---|---|---|
| 2,719,768 | 10/1955 | Webber | 277/208 |
| 3,353,875 | 11/1967 | Karge | 308/6 R |
| 3,692,272 | 9/1972 | Radke | 308/3.5 |
| 4,123,121 | 10/1978 | Ernst et al. | 308/6 C |
| 4,227,751 | 10/1980 | Albert | 308/6 C |
| 4,328,999 | 5/1982 | Olschewski et al. | 308/6 C |

*Primary Examiner*—Stanley N. Gilreath
*Assistant Examiner*—Thomas R. Hannon
*Attorney, Agent, or Firm*—Daniel M. Rosen

[57] ABSTRACT

A rolling bearing for lengthwise movement along a shaft comprised of an outer sleeve having a plurality of races therein for rolling bearings, a cage being provided to guide the rolling bearings. A sealing ring is provided at each end of the assembly, the sealing ring having lips extending radially inwardly to contact the shaft. The sealing lips are thin and elastically bendable, and are mounted to enable bowing thereof into free spaces on opposite sides thereof, depending upon direction of lengthwise movement of the shaft. As a consequence, for small movements of the shaft, the sealing lips cling to the shaft and become bulged, rather than sliding along the shaft.

8 Claims, 5 Drawing Figures

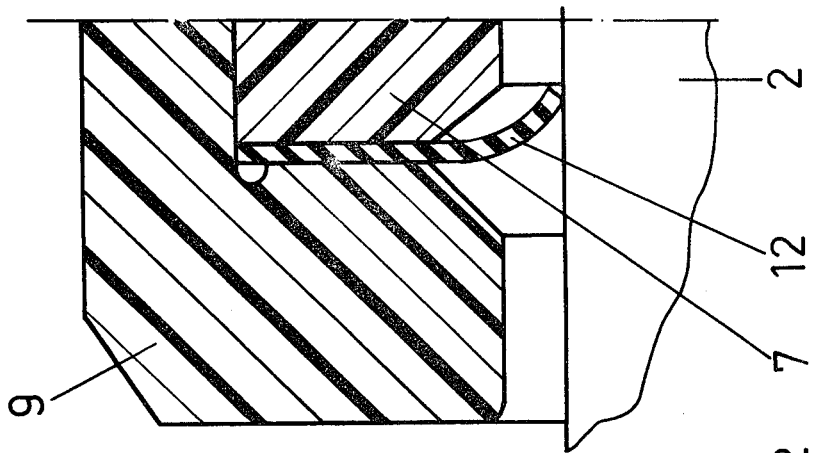
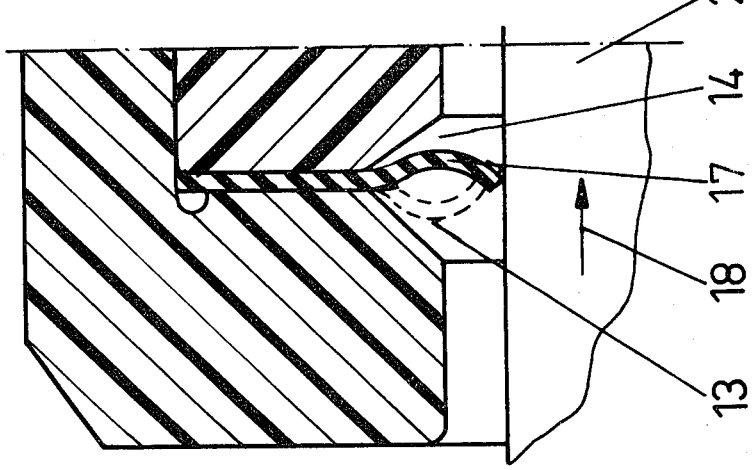
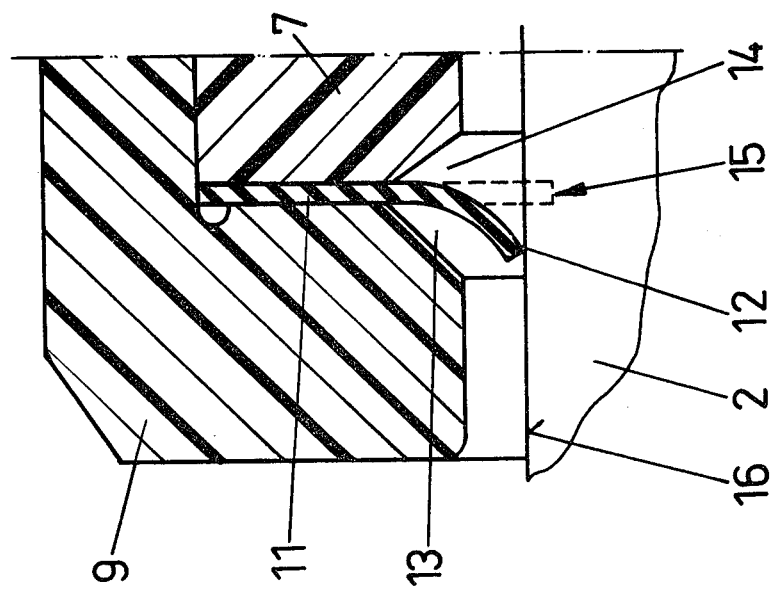

ROLLING BEARING FOR LENGTHWISE GUIDING OF A SHAFT OR THE LIKE

BACKGROUND OF THE INVENTION

This invention relates to a rolling bearing for the lengthwise guiding of a shaft or the like, comprised of an outer sleeve having axially extending races in its bore for guiding loaded rolling bodies and return races for unloaded rolling bodies. The bearing has at least one endless row of rolling bodies arranged in these races, and a sealing ring having a bore surface sliding on the shaft is provided at each end of the outer sleeve.

A rolling bearing of the above described type, in which the entire width of the bore of the sealing ring slides lengthwise along a shaft, is disclosed in DE-OS No. 2,814,917. The running friction, especially the starting friction, or initial breakaway friction of the sealing rings, is large in this rolling bearing, since these must be overcome, together with the starting friction and the inertia of the rolling bodies in the loaded and return races of the rolling bearing. As a consequence, at the beginning of lengthwise movement and also upon the reversal of lengthwise movement of the shaft from one direction into the other, larger friction peak and inertia forces occur in the rolling bearing, giving rise to noise and unsymmetrical running movements of the rolling bodies. This is of course undesirable in precision bearings, such as are provided in precision engineering.

In another known rolling bearing a sealing ring is snapped in the bore of each end ring, the sealing ring having inclined outwardly directed sealing lips sliding on the shaft (DE-AS No. 2,557,351). In this arrangement the sealing ring can cause a greater rubbing friction upon movement in one axial direction of the shaft, since the sealing ring moves inwardly as a result of the oversize of the axial friction force action on the sealing lip, and thereby the sealing lip is wedged tight between the outer ring or the housing and the shaft. As a result, under certain conditions this rolling bearing likewise can produce unsymmetrical and relatively large resistance to rolling, this is not permissable in many applications in precision machines.

The present invention therefore provides an arrangement comprising a rolling bearing for lengthwise movement along a shaft or the like, of the above type, which has satisfactory seals as well as relatively low running friction even with large oversize of the sealing ring sliding on the shaft. The respective resistance in the rolling bearing is relatively small at a start and in the reversal of the lengthwise movement of the shaft, in order to enable the use of the bearing in precision engineering and in precision machine equipment.

In the arrangement in accordance with the invention, the running friction and the inertia of the rolling body in the running and return races due to the existing acceleration is overcome at the start of the lengthwise movement of the shaft and the reversal of the lengthwise movement. When the rolling body is first brought into movement and accordingly has a low rolling friction, and the sealing lip begins to slide on the shaft, the sealing lip having a determined inclination or bending in the lengthwise direction. The clinging friction or breaking loose friction of the sealing lip shaft is thereby overcome. Since this clipping friction of the sealing lip occurs until a determined time at which the rolling bodies already have a low rolling friction, the running friction of the rolling bearing is Optimaly small upon changes in the movement in the lengthwise direction. Thereby, in an economical manner, an effective seal of the bearing space of the rolling body is insured by the sealing ring sliding on the shaft.

In another embodiment of the invention the end ring is advantageously affixed to the outer ring to compensate economically for manufacturing tolerances. In this arrangement the sealing ring is sealingly clamped fast between the end ring and the cage. The resultant resilient axial mounting of the cage of the outer sleeve also advantageously provides a noise damping action in operation.

In another embodiment of the invention, the bearing space is ventilated, so that the bow shaped bulging out of the sealing lip in the direction of change of the lengthwise movement of the shaft can be affected without being hindered by the back pressure in the inner space of the rolling bearing that inhibits bulging of the sealing lip. It is especially advantageous to provide a free space between two adjacent sealing lips on the sealing ring, with the two sealing lips being bowed to different degrees in operation.

The rolling bearing can be provided in use with relatively small disc shaped sealing rings for different applications, without requiring change of the connecting elements, such as the end ring outer ring and cage. The small space within which the sealing ring is confined, for example between the end ring and cage, is of course in many cases sufficiently small for the positioning of the elements of the rolling bearing, and therefore may be permissible in a bearing in which the sealing rings are not provided. The same rolling bearing can therefore be provided either with or without sealing rings.

Figure 3:
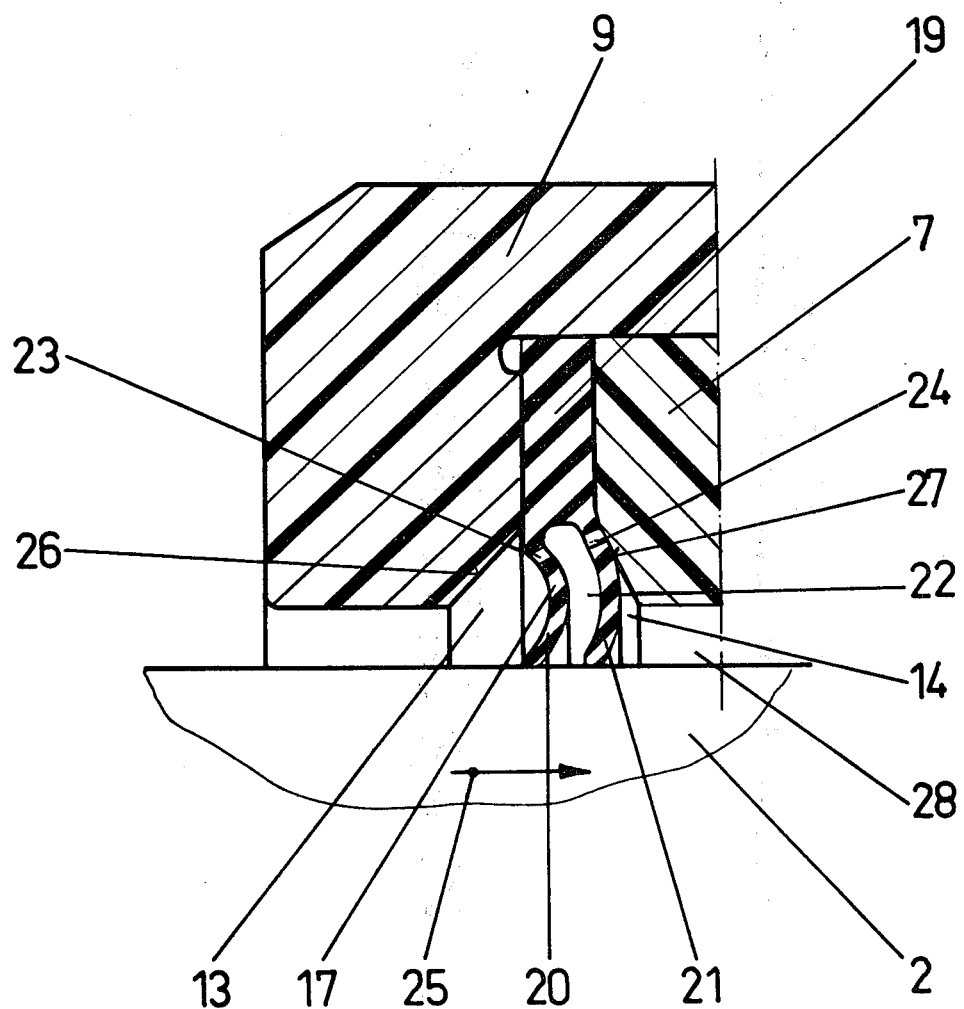

In order that the invention will be more clearly understood it will now be disclosed in greater detail in reference with the accompanying drawings, wherein:

FIG. 1 is a longitudinal cross-section of a rolling bearing in accordance with one embodiment of the invention, FIGS. 2a, 2b, and 2c are enlarged portions of the rolling bearings of FIG. 1 in the region of the sealing ring, and showing the condition of the sealing ring for different directions of movement of the shaft; and FIG. 3 is an enlarged cross-sectional view of a portion of a modification of the rolling bearing in accordance with the invention.

Referring now to the drawings, FIG. 1 is a cross-sectional view of a rolling bearing for guiding a shaft 2 in a lengthwise direction. The rolling bearing has an outer sleeve 1. Axially extending races 3 for loaded rolling bodies 4, and return races 5 for unloaded rolling bodies 6, are formed in the bore of the outer sleeve 1.

A cage 7 is arranged in the bore of the outer sleeve 1. This cage has guide tracks 8 on its circumference with each guide receiving one of the endless rows of rolling bodies 4, 6. The rolling bodies 4, 6 are spherical in this embodiment of the invention.

Both ends of the cage 7 extend axially beyond the recess of the sleeve 1, and end rings 9 are mounted on the outer surfaces of the axial ends of the cage. The rings 9 have radially inwardly extending collars 10 which cover the corresponding facing sides of the cage.

Sliding sealing rings 11 are clamped fast between each of the two end rings 9 and the cage 7, the bore surface of the sealing rings 11 sliding on the shaft 2. These sealing rings 11 are formed, in this embodiment, as thin discs. They have a thin elastically bending radially inwardly directed sealing lip 12.

As is apparent in FIG. 2a, the sealing lip 12 is bordered on both axial sides by free spaces 13, 14. In the disassembled condition of the shaft, 2 i.e., with the shaft removed, the inner bore surface of the sealing lip 12 of the sealing ring 11 has a smaller diameter 15 in the diameter 16 of the shaft 2, as shown by the dashed lines in FIG. 2a.

As soon as the shaft 2 is moved lengthwise in the bearing in the direction of the arrow 18, from the position illustrated in FIG. 2a, a bulge shaped protuberance 17 is formed to project into the free space 14 lying to the right thereof. As a consequence no rubbing friction is produced by the sealing lip 12, since the sealing lip clings to the shaft and its inner edge is carried therewith in the lengthwise direction of movement.

Upon further lengthwise movement of the shaft 2 in the direction of the arrow 18, the sealing lip 12 will finally attain the shape illustrated in FIG. 2c, in which it is bent over in the direction of the arrow 18. The sealing lip 12 now starts to slide along the shaft 2 due to the overcoming of the clinging friction or initial breakaway friction.

During the change of the position of the sealing lip 12 in FIG. 2a to the position shown in FIG. 2c, not only the increased running friction force but also the inertia of the acceleration of the rolling bodies 4, 6 is overcome. At the time of the starting and breaking loose of the sealing lip 12 in the position illustrated in FIG. 2c, the sealing lip 12 has a relatively low rolling friction with the rolling bodies. The resulting running friction of the rolling bodies is also minimum, since the high running friction of the rolling bodies never arises at the same time as the breakaway friction (i.e. clinging friction) of the sealing lip 12. The relationship of the rolling friction in sealing lip friction is analogous if the lengthwise movement of the shaft 2 in the direction of the arrow 18 stops and the shaft 2 executes a lengthwise movement in a direction opposite to that of the arrow 18. In this case a curved bulge shaped protuberance of sealing lip 12 is produced in the other free space 13, in the change of the position illustrated in the FIG. 2a to the position of the sealing lip illustrated in FIG. 2a. This is illustrated in dash lines in FIG. 2b.

The sealing ring 11 in the above case is formed of an elastic compressible material, for example an elastomer. As a result the cage 7 is held in the outer ring with elastic axial pre-stress by the insertion of the sealing ring 11, and is adjusted for construction tolerances, such as, for example variation in the width of the outer ring, by the more or less large axial compression that clamps the sealing ring 11 between the cage 7 and the sealing ring 9.

FIG. 3 is an enlarged cross-sectional view of a portion of a modification of a rolling body for lengthwise movement along a shaft 2. Similar to the arrangement illustrated in FIG. 1, the rolling bearing of FIG. 3 has an outer ring (not shown), a cage 7, and an end ring 9 on the cage 7 and affixed to the end of the outer sleeve. The end rings 9, only one of which is shown, in each case cover the corresponding axial facing side of the cage 7. In this modification of the rolling bearing the sealing ring 19 is clamped fast between the cage 7 and the end ring 9. This sealing ring 19 has two adjacent inwardly extending sealing lips 20, 21. Between the two sealing lips 20, 21 is a free space 22. An axially directed ventilation opening 23, 24 is provided on the radially outer end of each sealing lip 20, 21.

The two sealing lips 20, 21 are bulged out in the same direction, toward the free spaces 14, upon lengthwise movement of the shaft 2 in the direction of the arrow 25 of FIG. 3. As a consequence the sealing lip 20 is removed from its tendency toward the inwardly inclined facing surface 26 of the end ring 9, so that the outward ventilation of the free space 22 through the ventilation opening 23 of the sealing lip 20 can occur. At the same time the ventilation opening 24 of the sealing lip 2 is closed by the movement of this sealing lip toward the inclined inwardly directed facing surface 27 of the cage 7, so that a hermetic seal of the bearing space 28 results.

Upon lengthwise movement of the shaft 2 in a direction opposite to the direction of the arrow 25, the bulging of the sealing lip 20, 21 will occur in the opposite direction. Thus, the sealing lip 20 will bow out into the free space 13, while the sealing lip 21 will bow out into the free space 22. In this case the ventilation opening 23 of the sealing lip 20 engages the facing surface 26 of the end ring 9, and at the same time the sealing lip 21 is lifted from the facing surface 27 of the cage, so that ventilation of the free space 22 to the inner bearing space 28 can occur.

In the described lengthwise movement of shaft 2 in both directions, one of the two ventilation openings 23, 24 is always closed, so that inner bearing space 28 is reliably sealed outwardly by means of the sealing lip 20, 21 of the sealing ring 19.

The scope of the invention is not limited to the constructions of the above described embodiments of the invention. For example, more than two rapidly inwardly sliding sealing lips may be provided on the shaft on a common sealing ring, or on a plurality of sealing rings mounted adjacent one another. In addition, it is not necessary in accordance with the invention that the rolling bodies of the rolling bearing by spherical, since these rolling bodies may alternatively be cylindrical or be shaped to have vertically curved outer surfaces, if the races and the return races of the outer sleeve of the rolling bearings are formed accordingly. It is thus intended in the following claims to cover each such variation and modification as falls within the true spirit and scope of the invention.

What is claimed is:

1. In a rolling bearing for lengthwise movement along a shaft, comprised of an outer sleeve, axially extending races in the bore of the outer sleeve for loaded rolling bodies and return races for unloaded rolling bodies, with at least one endless row of rolling bodies positioned in said races, and a sealing ring mounted on each end of said outer sleeve, the bore surface of the outer sleeve adapted to slide on said shaft; the improvement wherein each said sealing ring has a thin elastically bendable radially inwardly directed sealing lip, the inner diameter of the bore of said sealing lips, when the shaft is not assembled in said rolling bearing, being less than the diameter of said shaft, said bearing having limiting walls defining free spaces on both the axially opposite sides of each sealing lip for limiting the movement, of said lips whereby said sealing lips may be selectively bulged in opposite axial directions into said spaces upon lengthwise movement of the shaft in opposite directions, when the shaft is assembled in the bore of said rolling bearing.

2. The rolling bearing of claim 1 further comprising a cage mounted within said outer sleeve and having guide channels for guiding the rolling bodies, and an end ring affixed to each end of said outer sleeve and covering the corresponding axially facing sides of said cage.

3. The rolling bearing of claim 2 wherein said sealing rings are clamped between the axial ends of said cage and the respective end rings, said sealing rings being of an elastic compressible material.

4. The rolling bearing of claim 1 wherein said sealing rings are disc shaped.

5. The rolling bearing of claim 1 further comprising ventilation openings extending through said sealing lips.

6. The rolling bearing of claim 1 wherein each of said sealing rings has a second thin elastically bendable radially inwardly directing sealing lip with an inner diameter substantially equal to that of the first mentioned sealing lip, said second sealing lips being axially spaced from the first mentioned sealing lips, to form a free space therebetween.

7. The rolling bearing of claim 6 wherein each of said sealing lips has a ventilation hole extending therethrough.

8. The rolling bearing of claim 7 further comprising inclined surfaces defining said free spaces at opposite sides of said sealing lips, whereby said ventilation holes are selectively sealed upon different direction of lengthwise movement of said shaft.

* * * * *

UNITED STATES PATENT AND TRADEMARK OFFICE
CERTIFICATE OF CORRECTION

PATENT NO. : 4,411,478
DATED : October 25, 1983
INVENTOR(S) : Armin Olschewski, et al.

It is certified that error appears in the above–identified patent and that said Letters Patent are hereby corrected as shown below:

```
        Column 1, line 42, change "permissable" to
--permissible--;
                 line 62, change "having" to --has--;
                 line 65, change "clipping" to --clinging--;
                 line 68, change "Optimaly" to --optimally--.
        Column 3, line 33, change "minimum" to --minimal--.
        Column 4, line 33, change "rapidly" to --radially--;
                 line 38, change "by" to --be--;
                 line 62, delete comma.
        Column 5, line 14, change "directing" to --directed--.
        Column 6, line 12, change "direction" to --directions--
```

Signed and Sealed this

Sixth Day of November 1984

[SEAL]

Attest:

*Attesting Officer*

GERALD J. MOSSINGHOFF

*Commissioner of Patents and Trademarks*